United States Patent [19]
Pavlovsky et al.

[11] 3,910,109
[45] Oct. 7, 1975

[54] APPARATUS FOR TESTING MECHANICALLY LOADED WHEEL-SHAPED COMPONENTS

[75] Inventors: Rudolf Pavlovsky; Fritz Mahnig; Werner Tobler, all of Schaffhausen, Switzerland

[73] Assignee: Georg Fischer Aktiengesellschaft, Schaffhausen, Switzerland

[22] Filed: Mar. 25, 1974

[21] Appl. No.: 454,277

[30] Foreign Application Priority Data
Mar. 29, 1973 Switzerland.......................... 4528/73

[52] U.S. Cl. ................................................ 73/146
[51] Int. Cl.²........................................ G01M 17/00
[58] Field of Search .............. 73/123, 117, 146, 126

[56] References Cited
UNITED STATES PATENTS
3,520,180  7/1970  Polhemus et al. ................. 73/146 X
3,546,936  12/1970  Tarpinian et al. ..................... 73/146

*Primary Examiner*—Jerry W. Myracle
*Attorney, Agent, or Firm*—Finnegan, Henderson, Farabow & Garrett

[57] ABSTRACT

An apparatus for testing mechanically loaded wheel-shaped components includes a plurality of parallel drive rollers which can be oriented at various angles relative to the axis of rotation of the components to simulate actual loads encountered in street traffic. The apparatus includes a plurality of ball bearing supports which permit accurate transmission and measurement of forces. In addition, the apparatus includes force measuring devices which measure radial and axial loads on the wheel-shaped components and braking forces exerted on the components.

15 Claims, 5 Drawing Figures

APPARATUS FOR TESTING MECHANICALLY LOADED WHEEL-SHAPED COMPONENTS

The present invention relates to an apparatus for testing mechanically loaded wheel-shaped components and, more particularly, to a wheel testing apparatus which allows accurate simulation of loads normally encountered in street traffic.

The apparatus is generally of the type having a shaft for setting and clamping the component and a plurality of parallel drive rollers, with means being provided for varying the spacing between the drive rollers and setting and clamping shaft. Such apparatus is known, e.g., French Pat. No. 1,366,584. However, as regards testing rims, it will not allow recording all the loads occurring in street traffic.

The present invention creates a universal testing apparatus, and in this sense is characterized by providing means for pivoting the rollers with respect to the axis of rotation of the object being tested, in order to vary the mutual angular position of the rollers and the axis of rotation of the test object.

An embodiment of the invention will be discussed in connection with the accompanying drawings, in which.

Figure 1:
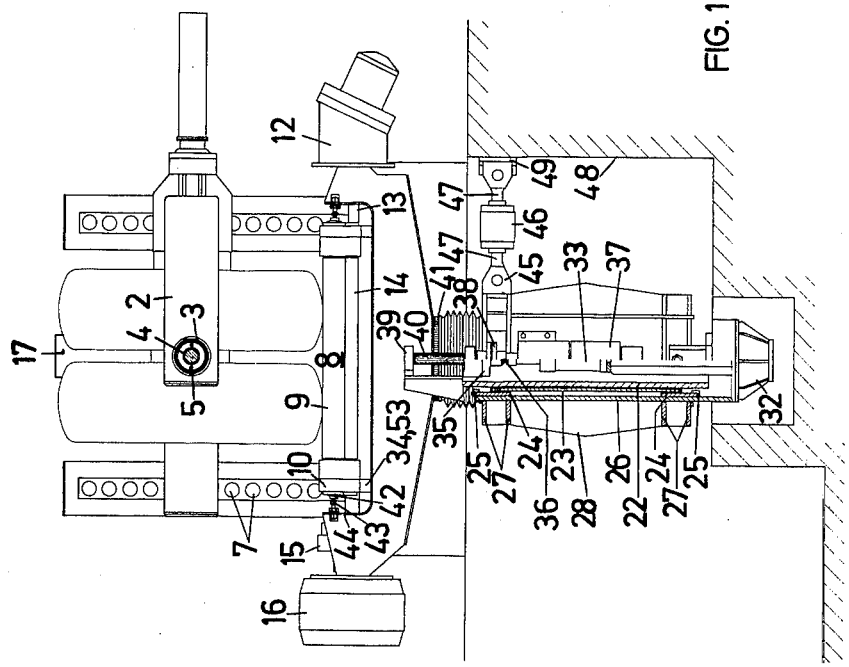
FIG. 1 is a front elevation of an apparatus for testing mechanically loaded, wheel-shaped components, shown in section in the upper part along line I—I of FIG. 2, and an exploded view of the lower parts.
Figure 2:
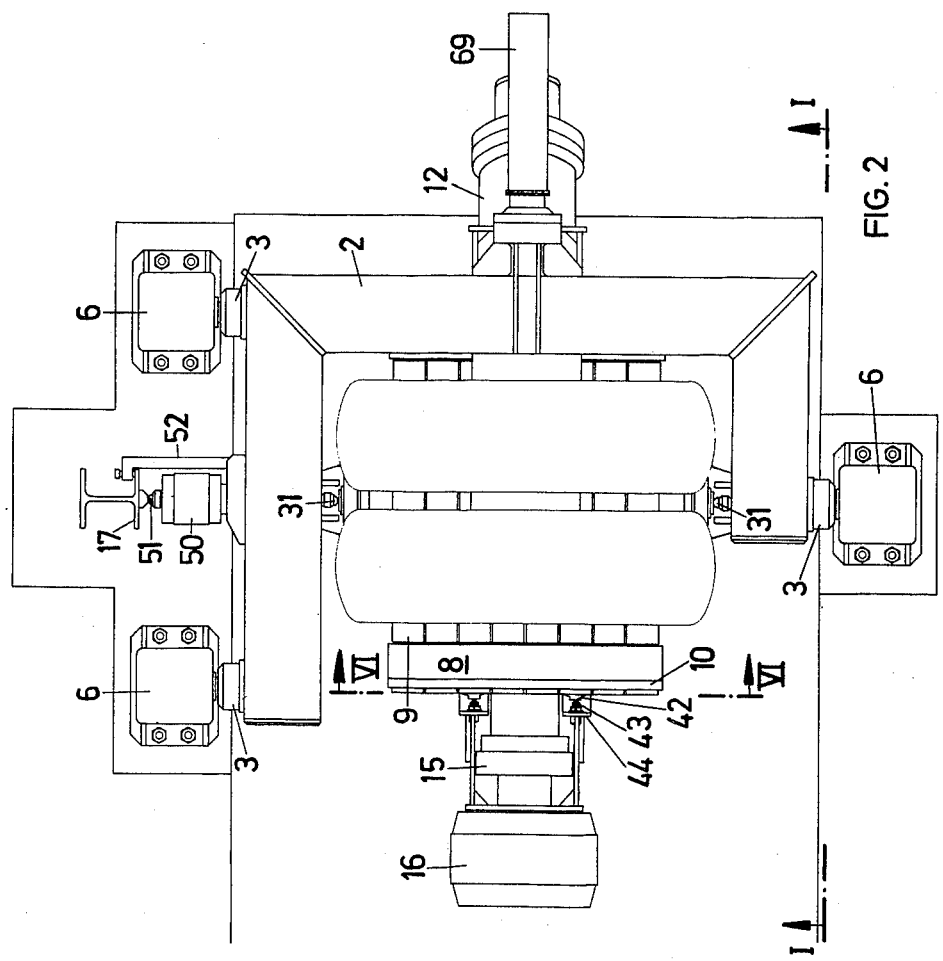
FIG. 2 is a top view of the apparatus of FIG. 1.
Figure 3:
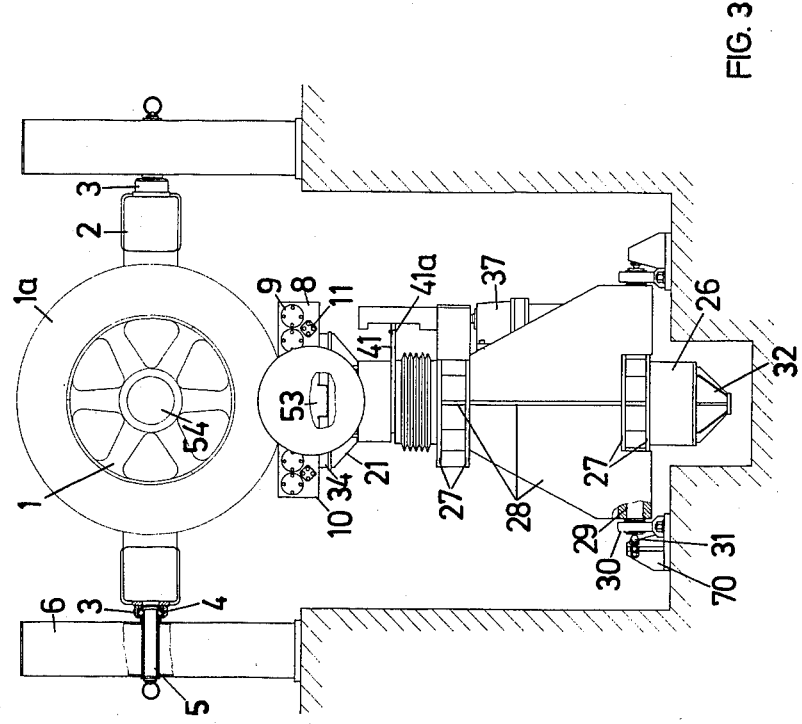
FIG. 3 is a side view of the apparatus of FIG. 1, partially in section.
Figure 5:
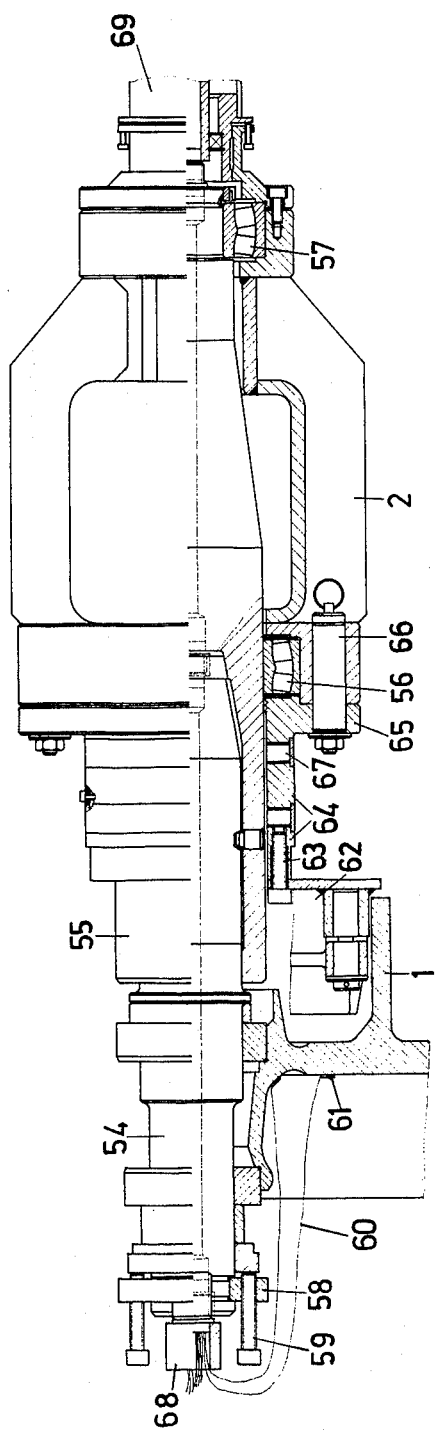
FIG. 5 is a view of the main shaft of the apparatus, partially in lengthwise section.

The apparatus shown in the drawings is mainly used for testing truck wheel rims and spokes. Referring to FIG. 3, a wheel to be tested (for instance up to diameters of 1,300 mm) comprises a spoke set 1 with a rim and tire 1a. As shown by FIGS. 1 and 2, two wheels are set up and clamped simultaneously in this instance. However, if desired, only a single wheel may be mounted. These two wheels are mounted on an overhung slip-mounted shaft 54 of a main shaft 55 (FIG. 5). Shaft 55 is maintained in place in a sturdily constructed frame 2. In order to adapt to the size of the wheel being tested, the height of frame 2 may be adjusted by steps with respect to a plurality of posts 6 (FIG. 2) which provide a support stand. Boreholes 7 (FIG. 1) are provided to that end in the support stand.

As shown in FIG. 2, frame 2 rests on three bearings 3. The two bearings nearer the fundamental beam of the U-shaped frame, i.e., the beam extending transversely relative to the wheel axes, are provided with four balls. The other bearing on the longer leg of the frame 2 is provided with two balls. Motion of frame 2 takes place in the plane of the FIG. 2, with the frame being moved to and fro. The outer bearing on the longer leg of frame 2 is provided only with two balls in order to allow and secure unhampered motion of frame 2 on the bearing pin in the plane of FIG. 2. FIG. 3 shows that corresponding ball bearings 4 are mounted on frame 2, and that associated bolts 5 pass through posts 6 with boreholes 7, acting as locking bolts.

Figure 4:
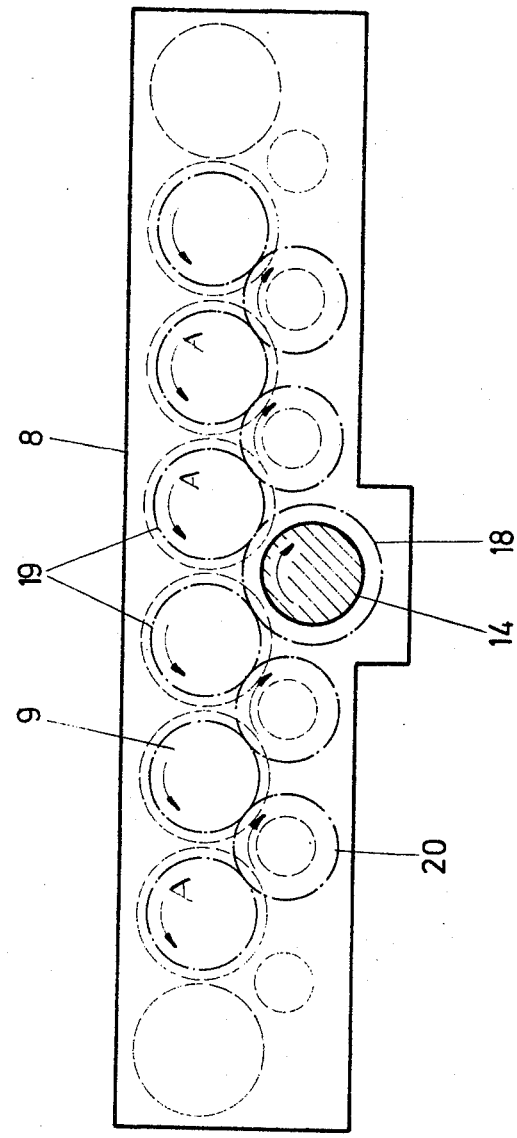
FIG. 4 is a diagrammatic representation of a roller table of the apparatus along line IV—IV of FIG. 2.

A roller table 8 including eight rollers 9 is provided for the purpose of driving the wheel by its periphery. As indicated in FIG. 4, only the inner six rollers 9 are driven. Each roller 9 is supported at both ends on roller bearings (not shown) in a pair of side-walls 10 between which the distance is determined by a pair of spacer bolts 11 (FIG. 3). Rollers 9 are driven by hydraulic motors 12 and 16 (FIGS. 1 and 2).

In order to eliminate unduly high power supplies, provision is made to examine separately two loading cases by means of this testing apparatus. In one case the effect of the radial force between rollers 9 and the wheel as well as the lateral force (in the axial direction) on the wheel will be measured, and in the other loading case, the radial force and the tangentially acting braking force on the wheel are determined. In the first case, high speed hydraulic motor 12 is activated thereby activating a main drive shaft 14 (FIG. 4) via an idle runner 13 (FIG. 1), while another idle runner 15 rotates so as not to drag along low-speed hydraulic motor 16. When determining the radial force and the tangentially acting braking force, the arrangement is reversed.

The six driven rollers 9 (FIG. 4) all will rotate in the same direction. The rate of rotation is the same for all. The rollers are driven counter-clockwise in the sense of arrows A (FIG. 4). Main drive shaft 14 includes a large gear 18 which drives the two center rollers via two gears 19. Power is transmitted to the other rollers 9 via intermediate gears 20 at a gear ratio of 1:1 (FIG. 4).

Roller table 8 rests on a support 21 (FIG. 3). Table 8 in turn supports both hydraulic motors 12 and 16 with idle runners 13 and 15. A guide tube 22 (FIG. 1) is connected to roller table support 21 by means of prestressed bolts (not shown). Vertical, low-friction motion of roller table support 21 and its pivoting by ±30° are ensured by a special ball bearing. The ball bearing comprises guide tube 22 and also a long ball race 23 with a pair of guide bushings 24. A pair of stops 25 limit the path through which ball race 23 may be shifted. A support pipe 26 encloses the whole ball bearing. A plurality of support rings 27 and a plurality of lengthwise, crosswise and radial ribs 28 strengthen and stiffen support pipe 26. The pipe, which is fixed with respect to height, is pivotably supported by a pair of bearing bolts 29 mounted in bearings 30 (FIG. 3). Balls 31 held in feet 70 ensure lateral support for all of support pipe 26. As shown in FIGS. 1 and 3, a support 32 is mounted at the bottom of pipe 26. A hydraulic cylinder 33 (FIG. 1) is mounted on the support.

In order to measure the compressive force from roller 9 acting radially on the wheel being tested, transmission of the force via side walls 10 of roller table 8 to the support surfaces 34 is provided. Each side wall 10 is equipped with a catch 53 which is centrally mounted and prevents shifting. The force is transmitted through support surfaces 34 to roller table support 21 and from the roller table support to a force measuring box 35 (FIG. 1) mounted in the direction of the force. The box is connected at its other end through a ball bearing 36 to the piston of cylinder 33. Ball bearing 36 allows and ensures jam-proof, appropriately directional measurement of the radially acting compressive force.

In order to determine the effects experienced by wheels while driving on curves, roller table 8 may be pivoted by means of a drive motor 37 (FIGS. 1 and 3) into a plane parallel to main shaft 55. Drive motor 37 via coupling 38 drives a long pinion 40 which is supported in a pair of bearing cases 39 and mates with a gear segment 41 rigidly connected to roller table support 21 by screws 41a (FIG. 3).

Whereas for normal driving, i.e., on a straight road, the axes of rollers 9 and main shaft 55 of the wheel-shaped objects being tested will be parallel to each other, the loading experienced while on curves is simulated by pivoting roller table 8, so that a lateral push will arise on the wheel being tested and rolling, as well as on the roller table. The push exerted on roller table 8 is transmitted via two prisms 42 (FIG. 1) and ball bearings 43 to two nose-like sides 44 of roller table support 21. In this instance again, because of ball bearings 43, transmission takes place almost without friction or any jamming moments, a situation of great significance for the measurement of force.

These forces acting on roller table 21 will attempt to shift the entire substructure with support pipe 26 in the plane of FIG. 1. Such shifting is prevented by laterally bracing support pipe 26 with a device which is radial to it. The bracing device comprises an eyelet 45 and a force-measuring box 46 connected to it and located between two pivotable links 47, which may rotate normally to the plane of FIG. 1. One of these links is connected to a bearing 49 mounted to cavity or pit wall 48. This radial bracing for pipe 26 is extremely resistant to tension or compression. Hence, support pipe 26 will only perform extremely minute pivoting motions about the two lower hinges or bearings 30 in the radial plane of support pipe 26 which is normal to said radial bracing. As regards the measurement data obtained from measuring box 46, a factor which must be taken into account is the lever ratio corresponding to the height setting of roller table 8, i.e., the constant distance between the axis of bearing bolts 29 and the axis of force measuring box 46 on one hand divided by the distance between the axis of force measuring box 46 and the center contact point of the corresponding rollers 9 with the tested wheel. This distance varies and depends not only to a slight extent on the compression, but also on the size of the wheel. A lift-measuring device with potentiometer corrects this force transmission ratio (not shown).

A brake shoe 62 (FIG. 5) acting on the wheel hub is provided for simulating the braking process. Upon activation of the brake shoe, a braking force is generated, the reaction of which pushes frame 2 against support 17. This force is absorbed by a force measuring box 50 (FIG. 2) provided with a ball bearing 51 and is measured by the box. A bracket 52 keeps frame 2 in the proper position and absorbs any opposing forces. Frame 2, which rests on the balls of ballraces 4 in housing 3, is displaced laterally only by about 1–2 mm in the manner of overall deformation for full braking force. This frame suspension will be free from friction to an extraordinary degree if provided with the necessary play between ball races 4 and bolts 5. Therefore, the braking force will be measured virtually without error as a tangential force between the test wheel and rollers 9. This braking force is transmitted via rollers 9 to roller table 8, from which it will be transmitted through catches 53 to roller table support 21. A force arising in this position has a line of action which does not coincide with that of force-measuring box 46, with the result that corresponding force components will load bearings 30 or the balls of the ball bearings. These parts will absorb the moments generated.

The wheel being tested, whether single or double, rests on the interchangeable plug-in shaft 54 (FIG. 5). Main shaft 55 is supported by a pair of roller bearings 56 and 57, of which the larger one, i.e., bearing 56, will absorb only radial forces, while the smaller one, i.e., bearing 57, will absorb both radial and axial forces. The wheel is mounted on plug-in shaft 54 by a plate 58 with a bayonet lock and a pair of bolts 59. The wheel is kept axially pre-stressed.

One or more strain gauges 61 (FIG. 5) mounted on spoke wheel 1 are used for measuring its mechanical loading. Leads 60 extend from the strain gauges through the plug-in shaft 54 and main shaft 55 and three connection boxes to an rpm transmitter 69. The transmitter comprises a set of slip rings each with one brush-set (not shown) and one connection to a measured data storage and print-out apparatus. Since the data storage and printout apparatus are not the object of the present invention, it is neither shown nor described in detail.

Depending on whether low speed hydraulic motor 12 or high speed hydraulic motor 16 is hooked up to the hydraulic facility, rollers 9 of roller table 8 will rotate slowly (e.g., no more than 0.5 meter/sec) when loaded by radial and braking forces, or rapidly (e.g., no more than 5 meter/second) when loaded by radial and lateral forces, i.e., when roller table 8 has been pivoted with respect to the wheel axle. It must be noted that the 5 meter/second speed for oblique motion represents the assumption for proper wheel rolling. The ten-fold lesser tangential roller speed during braking is dictated by a reasonable drive power (less than 100 kw).

The flange of brake shoe 62 is mounted by bolts 63 to a set of spacer rings 64 allowing fitting of brake shoe 62 to the test wheel. Spacer rings 64 are provided with recesses 67 in the manner of jaw-clutch couplings and are held and centered by a flange 65 with two tightening bolts 66. Flange 65 is provided with eight equidistantly spaced boreholes, so that the position of brake shoe 62 may be varied with respect to the direction of the radial force in steps of 45°.

The operation of the described testing apparatus is very simple. First frame 2 is adjusted to the approximately proper height for the wheel diameter involved by means of the coarse adjustment, i.e., boreholes 7 and bolts 5. The wheel taped with strain gauges 61 is mounted on plug-in shaft 54 and leads 60 are hooked up to the measurement electronics via connector 68. Then high-speed hydraulic motor 12 is turned on. Roller table 8 is lifted by cylinder 33 and rollers 9 are pressed against the outer surface of the test object. The radial compression force will be measured by force measuring box 35 and recorded accordingly. Drive motor 37 will continuously pivot roller table 8 outward during curve simulation until the proper desired lateral force has been obtained at the corresponding instrument supplied from force measuring box 46. When rotating the wheel, the measured minimum and maximum stresses obtained from the strain gauges 61 will be stored by the measuring electronics (not shown) in the same array with the magnitudes of the radial and lateral forces and then will be displayed.

As regards the braking test, the rollers 9 will be parallel to the wheel axis. Brake shoe 62 is then activated. Again the minimum and maximum stresses and the radial and braking forces that were set will be stored, then printed out. The braking force is detected by force measuring box 50. For wheels of small diameters, one may further brake while on an oblique course, provided the available power will suffice for braking at speeds of 5 meter/second.

The above described test-equipment holds the great advantage of extremely minute frictional forces being present in all joints and in all rectilinear motions even when applying maximum forces. Therefore, the forces arising may be measured virtually without error. Frame 2, which is statically determined, rigid and adjustable in height, and supported in ball-bearings 4, because of the overhung support of main shaft 55 will allow rapid installation of the wheel to be tested on the plug-in shaft 54, both for the brittle lacquer method or for pasted-on strain gauges 61. The entire support pipe 26 together with the hydraulic drive blocks in the form of the two hydraulic motors 12 and 16 and cylinder 33, which are placed into the pit, forms a unit of compact construction. Only roller table support 21 with roller table 8 and the two hydraulic motors 12 and 16 project above ground. The saving in space obtained from such arrangement is very considerable. Because of the sturdy design of roller table 8, an increase in lateral rigidity from special construction elements will not be needed, the support effect being provided by roller table rest 21.

By making use of other roller tables, for instance of smaller roller diameters, any kind of smaller or larger wheels may be measured by means of the described apparatus.

It must be emphasized that when riding on curves in the radial direction of the wheel being tested, there will be either no forces, or forces in the radial direction that are independent of the lateral forces, so that force-measuring box 50 will always indicate the same constant force, which is independent of the pivoting angle of roller table 8.

The invention in its broader aspects is not limited to the specific details shown and described, and modifications may be made in the details of the wheel testing apparatus without departing from the principles of the present invention.

What is claimed is:

1. An apparatus for testing mechanically loaded wheel-shaped components, comprising:
   a shaft for supporting a wheel-shaped component to be tested;
   a plurality of parallel drive rollers for engaging the wheel-shaped component;
   a common roller table for supporting said drive rollers;
   drive means for imparting rotation to the wheel-shaped component; and
   means for pivoting said drive rollers with respect to axis of rotation of the wheel-shaped component to vary the mutual angular position between said drive rollers and the axis of rotation.

2. The apparatus of claim 1, which includes:
   means for varying the spacing between said drive rollers and said shaft to accommodate wheel-shaped components of various size.

3. The apparatus of claim 1, wherein said drive means rotates at least part of said drive rollers to impart rotation to the wheel-shaped component.

4. The apparatus of claim 1, wherein said roller table is mounted on a pivotable support.

5. The apparatus of claim 4, which includes:
   force transmitting elements located on opposite sides of said roller table and provided with balls for transmitting lateral forces exerted on said roller table to said support.

6. The apparatus of claim 5, which includes:
   pivot means for mounting said support for pivotal movement about an axis perpendicular to the axis of rotation of the wheel-shaped component, said pivot means including balls for engaging opposite sides of said support to limit lateral movement of said support along said perpendicular axis.

7. The apparatus of claim 4, which includes:
   means for lifting said roller table relative to said support to exert radial compressive forces on the wheel-shaped component.

8. the apparatus of claim 7, which includes:
   a first force measuring device coupled to said roller table for measuring radial compressive forces loaded on the wheel-shaped component; and
   a second force measuring device coupled to said support for measuring lateral forces loaded on the wheel-shaped component when said drive rollers are oriented at an angle with respect to the axis of rotation of the component.

9. The apparatus of claim 8, wherein:
   said lifting means comprises a hydraulic cylinder mounted on said support and a ball bearing interposed between said cylinder and said first force measuring device for transmitting forces from said cylinder to said roller table.

10. The apparatus of claim 8, which includes:
    a brake shoe provided on said shaft for exerting braking forces on the wheel-shaped component; and
    a third force measuring device for measuring braking forces exerted on the wheel-shaped components.

11. The apparatus of claim 1, wherein said drive means comprises:
    first and second hydraulic motors mounted on said roller table; and
    first and second idlers for coupling said first and second hydraulic motors, respectively, to said drive rollers;
    said first motor driving said rollers approximately ten (10) times faster than said second hydraulic motor.

12. An apparatus for testing mechanically loaded wheel-shaped components, which includes:
    a shaft for supporting a wheel-shaped component to be tested;
    a frame for supporting said shaft;
    a plurality of ball bearings for supporting said frame in a generally horizontal orientation and allowing said frame to shift laterally in its horizontal plane;
    a plurality of parallel drive rollers for engaging the wheel-shaped component;
    drive means for imparting rotation to the wheel-shaped component; and
    means for pivoting said drive rollers with respect to the axis of rotation of the wheel-shaped component to vary the mutual angular position between said drive rollers and the axis of rotation.

13. The apparatus of claim 12, wherein said frame is adjustable in height to allow the apparatus to accommodate wheel-shaped components of various size.

14. The apparatus of claim 12, wherein:
    said frame is U-shaped in configuration and includes a fundamental beam extending transverse to the axis of rotation of the wheel-shaped component and a pair of legs extending from opposite ends of said beam parallel to the axis of rotation.

15. The apparatus of claim 14, wherein:
    one of said bearings is mounted at the free end of one of the legs of said frame and includes two diammetrically arranged balls to allow frame motion in two different orthogonal directions.

* * * * *